Dec. 1, 1936.  A. H. LANGDON  2,062,584
ORIFICE METER PLATE
Filed Dec. 23, 1935

INVENTOR
ANDREW H. LANGDON
by John A. McDowell
his atty.

Patented Dec. 1, 1936

2,062,584

UNITED STATES PATENT OFFICE 2,062,584

ORIFICE METER PLATE

Andrew H. Langdon, Los Angeles, Calif.

Application December 23, 1935, Serial No. 55,861

2 Claims. (Cl. 138—44)

This invention relates more particularly to an improvement on the present day meter plates now in use.

An object of the invention is to provide a formed disc spring fixed to an orifice disc which is detachably held in a shiftable disc carrier by a single part in the form of a ring. This disc sealing ring is operable to bring pressure against the formed disc spring to retain the orifice plate disc in position to seal with the carrier and is operable to form an effective fluid tight seal between the sealing ring and the body of the fitting and between the orifice fitting and the carrier sealing face.

A feature of the invention is that through the use of the spring forming a pressure against the sealing ring it is not necessary to use any mechanical means thus eliminating the orifice plate set screws.

Simplicity with maximum strength and cheapness of construction are other objects and a construction that may be readily embodied in various types and classes of orifice meter fittings and the like.

Other objects, advantages and features of the invention may appear from the accompanying drawing, the subjoined detailed description and the appended claims.

The accompanying drawing illustrates the invention.

Figure 1:
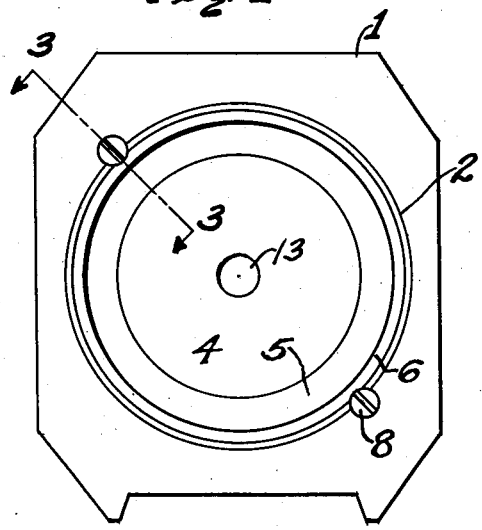
Figure 1 is a front elevation of the disc carrier embodying the features of the present invention.
Figure 2:
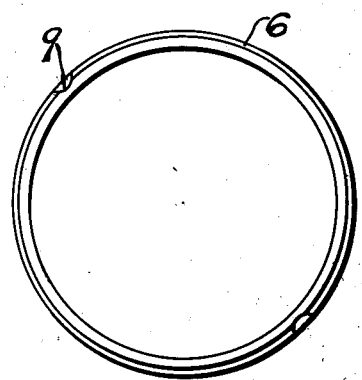
Fig. 2 is a detail face view of the sealing ring showing the screw slots therein.
Figure 3:
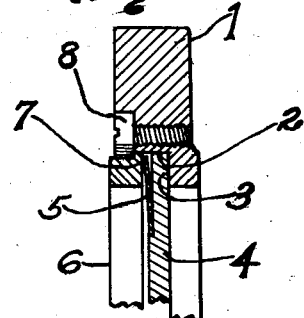
Fig. 3 is an enlarged fragmental sectional detail view taken on line 3—3 Fig. 1 showing how the sealing ring is held in place against the formed spring by the screws to hold the orifice insert in place.
Figure 4:
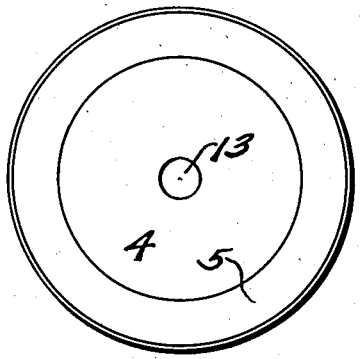
Fig. 4 is a front elevation of the orifice insert showing how the formed spring is fixed thereto.
Figure 5:
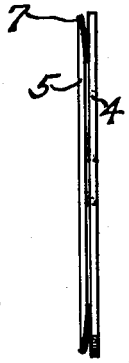
Fig. 5 is an end view of Fig. 4.

This invention and construction is for removably retaining and for sealing about the orifice plate disc in position to seal with the carrier and is operable to form an effective fluid tight seal between the sealing ring and the body of the fitting and between the orifice fitting and the carrier sealing face and may be employed in connection with or embodied in orifice meter fittings of various types and classes.

1 designates the shiftable disc carrier, having an opening 2 and provided with a shoulder seat 3 that permits of seating an orifice disc insert 4 therein.

The orifice disc insert 4 is provided with a formed spring 5 fixed thereto that permits of a sealing ring 6 mounted in the opening 2 of the carrier 1 to bring pressure against the end 7 of the spring through the screws 8 that are carried by the carrier.

The sealing ring 6 being provided with counter bores 9 to permit the heads of screws 8 to rest therein.

Figure 7:
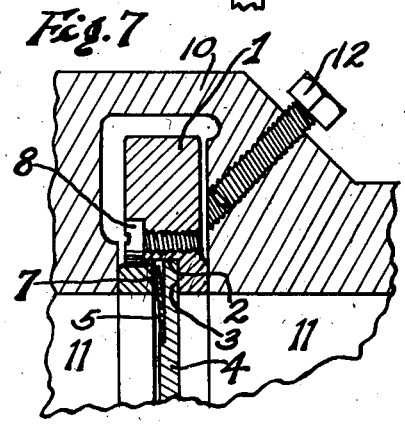
Fig. 7 is a fragmental sectional detail view showing a fragment of the fitting and also shows how the carrier, formed spring and sealing ring are held in place by the screws.
Figure 6:
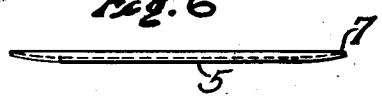
Fig. 6 is a detail end view of the formed spring.

As shown in Fig. 7 of the drawing just enough of a fitting is shown to locate the invention and 10 indicates the body having a fluid passage 11 and clamping screws 12 that would be eliminated with this invention.

I claim:—

1. In a device of the character set forth of a shiftable disc carrier having an opening provided with a seating shoulder and a sealing face on its outer side; an orifice disc insert against said shoulder having a formed spring fixed to the outer face of said insert; a sealing ring mounted in said carrier opening and held to bring pressure against said formed spring by a plurality of screws carried by said carrier to retain the insert in position to form a seal with the carrier.

2. In a device of the character set forth of a shiftable disc carrier having an opening provided with a seating shoulder and a sealing face on its outer side; an orifice disc insert against said shoulder having a formed spring fixed to the outer face of said insert; a sealing ring mounted in said carrier opening and held to bring pressure against said formed spring by a plurality of screws carried by said carrier to retain the insert in position to form a seal with the carrier and is operable to form an effective fluid tight seal between the sealing ring and the body of the fitting and between the orifice disc insert and the carrier seating shoulder and between the orifice fitting and the carrier sealing face.

ANDREW H. LANGDON.